United States Patent
Care et al.

(10) Patent No.: US 8,535,013 B2
(45) Date of Patent: Sep. 17, 2013

(54) AEROENGINE FAN ASSEMBLY

(75) Inventors: Ian Colin Deuchar Care, Derby (GB); Dale Edward Evans, Derby (GB)

(73) Assignee: Rolls-Royce PLC (GB)

( * ) Notice: Subject to any disclaimer, the term of this patent is extended or adjusted under 35 U.S.C. 154(b) by 895 days.

(21) Appl. No.: 12/413,615

(22) Filed: Mar. 30, 2009

(65) Prior Publication Data

US 2009/0269203 A1    Oct. 29, 2009

(30) Foreign Application Priority Data

Apr. 7, 2008    (GB) .................................. 0806171.5

(51) Int. Cl.
*F01D 5/30* (2006.01)

(52) U.S. Cl.
USPC .................... 416/221; 416/212 R; 416/212 A

(58) Field of Classification Search
USPC ................... 416/221, 212 R, 212 A
See application file for complete search history.

(56) References Cited

U.S. PATENT DOCUMENTS

| 3,104,093 A | 9/1963 | Craig et al. |
| 4,580,946 A | 4/1986 | Bobo |
| 4,655,687 A * | 4/1987 | Atkinson .................. 416/193 A |
| 5,520,514 A | 5/1996 | Mareix et al. |
| 5,791,877 A | 8/1998 | Stenneler |

FOREIGN PATENT DOCUMENTS

| EP | 1881160 A2 | 1/2008 |
| GB | 1276106 A | 6/1972 |
| GB | 1331209 A | 9/1973 |
| GB | 2171151 A | 8/1986 |
| GB | 2279413 A | 1/1995 |
| GB | 2401658 A | 11/2004 |
| GB | 2420162 A | 5/2006 |

OTHER PUBLICATIONS

European Search Report dated Nov. 20, 2012 from the corresponding EP Patent Application No. EP09250676.

* cited by examiner

*Primary Examiner* — Long Pham
(74) *Attorney, Agent, or Firm* — McCormick, Paulding & Huber LLP

(57) ABSTRACT

A fan assembly of a gas turbine engine, the fan assembly includes an array of radially extending blades defining gaps therebetween and an annulus filler located within at least one gap. The annulus filler includes at least two individual bodies arranged circumferentially adjacent one another with at least one adjacent a blade, one of the bodies includes a flexible wall arranged to centrifuge outwardly against the other body thereby urging both bodies against the blades and securing them during engine operation.

14 Claims, 4 Drawing Sheets

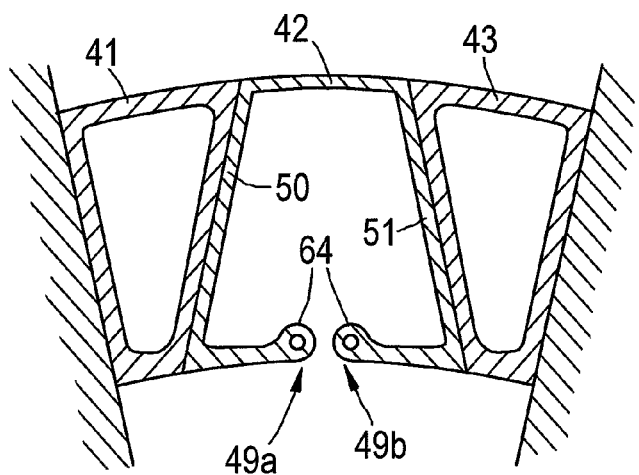
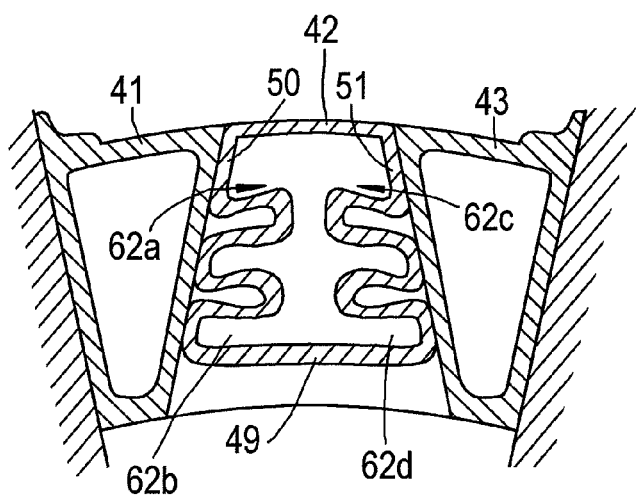
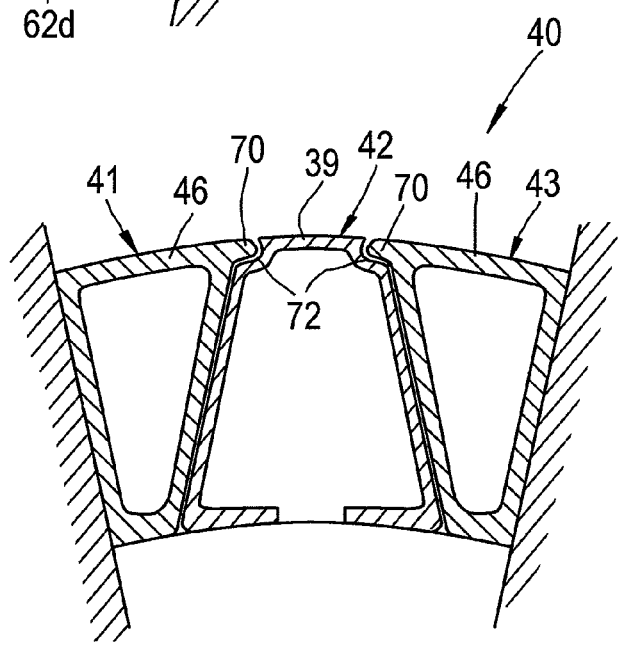

AEROENGINE FAN ASSEMBLY

CROSS REFERENCE TO RELATED APPLICATION

This application is entitled to the benefit of British Patent Application No. GB 0806171.5, filed on Apr. 7, 2008.

FIELD OF THE INVENTION

The present invention relates to bladed structures for fluid flow propulsion engines such as an aeroengine fan assembly and in particular annulus fillers located between adjacent compressor blades, particularly for low pressure compressor blade or a fan stage of a gas turbine engine.

BACKGROUND OF THE INVENTION

Annulus fillers span the radially inner aerodynamic annulus gap between fan or compressor blades. The width of the annulus gap varies during engine operation because of blade vibrations, relative movement of adjacent blades and twisting of blades. Thus the annulus filler is required to fill a varying width between blades.

An annulus filler is a weight-efficient solution rather than forming the annulus line using an integral part of a disc and can offer better sealing. Current annulus fillers used on the Applicant's Trent® series of engine fillers are machined aluminium alloy forging. The annulus filler is self-loading and as a rotating component, the majority of the forces during running are generated by its own mass. A lighter weight annulus filler would thus reduce its own internal forces, and reduce forces on the fan disc. A secondary benefit in reducing the mass of these components is to reduce the weight of the engine module. This will contribute to improved efficiency of the aircraft.

There are numerous annulus filler designs in use today and most are attached to the disc via pins, dovetail joints or hook arrangements to engage the blade or disc or both. These arrangements require dedicated features on the disc, which being a critical part, necessitates special design and manufacturing control. Furthermore, these fixtures and features are prone to wear and/or fretting fatigue that is clearly highly undesirable for a critical part. These conventional arrangements require also separate compliant seals between the annulus fillers and blades and these seals are notoriously difficult to secure and often fail in service.

SUMMARY OF THE INVENTION

Preferably, annulus fillers include an upper platform that forms an airwash annulus line between adjacent blades. The platform edges that abut the blades are known to cause fretting and damage to the blade surface. This is particularly important where composite materials are used for the blade and/or annulus filler.

Therefore, it is an object of the present invention to provide a fan assembly with an annulus filler that seals against the blade to minimize turbulence generation in the gas flow, is capable of accommodating blade vibration and movement, and is resilient in the event of a blade excursion as well as being light weight.

In accordance with an aspect of the present invention, a fan assembly of a gas turbine engine, the fan assembly includes an array of radially extending blades defining gaps therebetween and an annulus filler located within at least one gap characterised in that the annulus filler includes at least two individual bodies arranged circumferentially adjacent one another with at least one adjacent a blade, one of the bodies includes a flexible wall arranged to centrifuge outwardly against the other body thereby urging both bodies against the blades and securing them during engine operation.

Preferably, there are three individual bodies arranged circumferentially adjacent one another, only two bodies are located against adjacent blades.

Preferably, the central body includes two flexible walls each arranged to centrifuge outwardly against an adjacent body.

Preferably, the flexible wall is angled $\alpha$ from a radial line.

Alternatively, the flexible wall is arcuate with its centre of gravity is circumferentially offset from a radial line and arranged to centrifuge outwardly against the other body.

Alternatively, the flexible wall is bellowed or a concertina.

Preferably, the flexible wall is arranged to provide a bias against the other body thereby urging both bodies against the blades and securing them particularly when the engine in not operational.

Preferably, one of the bodies includes a radially inner wall arranged to provide a bias against the other body thereby urging both bodies against the blades and securing them particularly when the engine in not operational.

Preferably, the radially inner wall is formed of two fingers.

Alternatively, a fillet is provided radially outwardly of the body and between the body and the blade.

Preferably, the fillet is integral to the blade or body.

Preferably, the fillet defines a recess and the shape of the body compliments the recess defining sloping surfaces and respectively, thereby providing a force to urge the body against the blade.

Advantageously, at least one box includes a circumferentially extending arm at a radially outer part and which overlaps another body. At least one body includes a circumferentially extending groove into which the arm engages.

BRIEF DESCRIPTION OF THE DRAWINGS

FIG. 8 is a section, AA in FIG. 2, through part of a fan assembly showing assembly and removal features of an annulus filler in accordance with the present invention;

FIGS. 9 and 10 are section, AA in FIG. 2, through part of a fan assembly showing a fourth embodiment of an annulus filler in accordance with the present invention;

FIG. 11 is a section, AA in FIG. 2, through part of a fan assembly showing details of an annulus filler in accordance with the present invention.

DETAILED DESCRIPTION OF THE PREFERRED EMBODIMENTS

Figure 1:
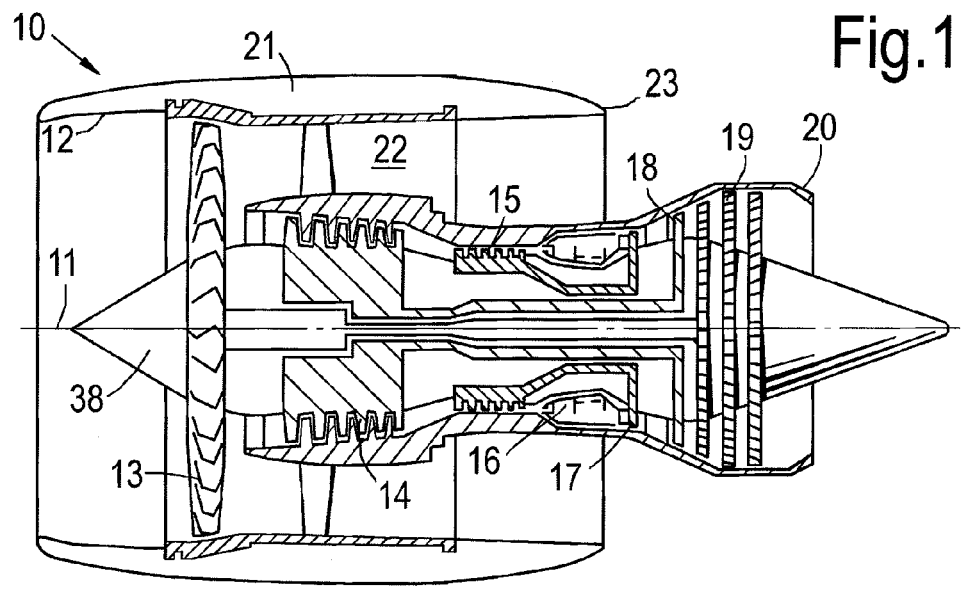
FIG. 1 is a schematic section of part of a ducted fan gas turbine engine incorporating an embodiment of the present invention.

With reference to FIG. 1, a ducted fan gas turbine engine generally indicated at 10 has a principal and rotational axis 11. The engine 10 includes, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

Figure 2:
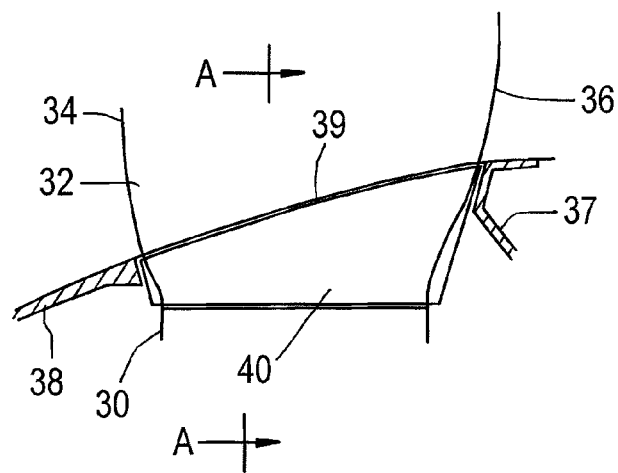
FIG. 2 is a radial section through part of a fan assembly showing the arrangement of a blade, a disc and a first embodiment of an annulus filler in accordance with the present invention.
Figure 3:
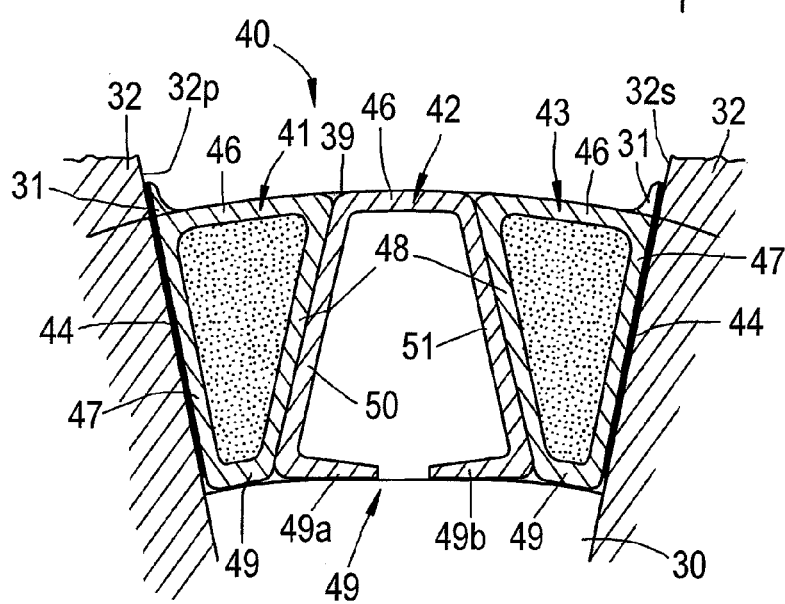
FIG. 3 is a section, AA in FIG. 2, through the annulus filler of the present invention.

Referring now to FIGS. 2 and 3, the propulsive fan 13 is a conventional assembly comprising a rotor disc 30 and an annular array of radially extending blades 32. The blades 32 are mounted to the disc 30 via dovetail joints, not shown but well known in the art. Each blade 32 includes an aerofoil having pressure and suction surfaces that extend axially between a leading edge 34 and a trailing edge 36 and extend radially between a dovetail root and a blade tip. A generally conical spinner fairing 38 (see FIG. 1 also) defines an aerodynamic surface in front of the disc 30.

An annulus filler 40 spans a radially inner annulus gap between adjacent fan blades 32 and forms an aerodynamic airwash surface 39. The blades 32 are arcuate between their leading and trailing edges 34, 36 such that a pressure surface 32p is concave and a suction surface 32s is convex. The annulus gap effectively widens between the leading and trailing edges 34, 36 as the radial height of the aerodynamic surface 39 increases and therefore subtends a greater circumferential length.

The present invention is an annulus filler 40 comprising at least two box-section bodies and in the exemplary embodiment of FIG. 3 is formed from three OMC (Organic Matrix Composite) bodies in the form of box-sections 41, 42, 43 located between adjacent fan blades 32. Two of these box-sections 41, 43 each comprise a radially outer wall 46, partly defining the inner annulus airwash surface 39, two generally radially extending side walls 47, 48 and a radially inner wall 49. The side wall 47 is attached to the fan blade 32 and generally follows its surface profile. The side wall 48 is arranged to taper the box section 41, 43 towards the inner wall 49 and in this embodiment allows a relatively short inner wall 49. In other examples, the wall 49 may be excluded and the two side walls 47, 48 simply meet at a point.

An Organic Matrix Composite is a generic term or more explicitly, in this embodiment, a polymer matrix carbon fibre reinforced composite. This is a particularly useful material in this application; however, other composites, plastics or metals may be used.

The two bodies or boxes 41, 43 are preferably are filled with a low density foam material such as Rohacell® or other similar light weight core to facilitate the transfer of load between walls 46, 47, 48. Alternatively the boxes 41, 43 may contain an internal bracing web, which is preferably manufactured integrally to the box sections. The upstream and downstream ends of the boxes 41, 43 are closed, but may be open.

Two of these box-sections 41, 43 are attached to the fan blade 32 surfaces with a high shear fixing, such as an industrial 'hook and loop' layers 44 (e.g. Velcro®), preferably before assembly of the fan blade 32 to the disc 30. The industrial hook and loop layers 44 consist of two cooperating layers, one comprising an array of hooks the other a fabric-like material comprising loops, which become entangled with one another thereby fastening the layers together. The hook and loop layers 44 may be co-moulded with the fan blade and annulus filler box 41, 43 respectively before assembly. Alternative to the hook and loop layers 44, an adhesive or high-friction substance may be used.

The central box 42 completes the annulus surface 39 and is generally configured similarly to boxes 41, 43; however, side walls 50, 51 diverge radially inwardly from the upper wall 46 to the lower wall 49. The lower wall 49 includes a split defining fingers 49a, 49b. The fingers 49a, 49b are biased downwardly so they provide a radially outward force to each adjacent box 41, 43 to hold the annulus filler 40 in the gap when the engine in not running. During engine running, centrifugal forces acting on the side walls 50, 51 of the central box 42 further urge them outwardly and against the outer boxes 41, 43 that in turn force against their hook and loop layers 44 increasing their attachment strength. The complete annulus filler 40 remains in place as the hook and loop layers 44 are in shear and compression rather than tension and peel. Other forms of attachment to the fan blades 32 are also benefited in this way. Attachment to the blades 32 is advantageous as the prior art's expensive and heavy retention features on the disc 30 are avoided.

The filler boxes 41, 42, 43 are restrained axially by adjacent components, which in this case are the spinner fairing 38 and an annular armature 37 as illustrated in FIG. 2.

The present invention is particularly useful where the boxes 41, 42, 43 of the annulus filler 40 are made from composite material such as carbon fibre reinforced plastics which are widely available and are relatively simple and cheap to manufacture by resin transfer moulding methods. These simple boxes may be braided structures, which allows cylindrical and generally tubular shapes (like the boxes 41, 42, 43) to be formed and also the formation of projections and lands. Such projections and lands are useful for to provide suitable structure for a bolted or pinned connection into the annular armature 37. Braided structures are generally machine manufactured to form the shape and interweave of the fibres. Braiding machines are capable of producing interwoven fibres at varying angles, such as 300/600 and 450/450 fibre direction. The drape of a braided structure is easier to manipulate over irregular shapes than when using individual sheets of fibre reinforced material and thus avoids the complexities of joins between sheets of material. A braided structure also avoids complex dovetail such as T-junction shapes.

The boxes 41, 43 are removed from the fan blades 32, after removal of the blade, by peeling them off from a radially outer or inner edge thereby reducing any risk of damage to either the blade 32 or disc 30.

The OMC boxes 41, 42, 43 can be hollow, internally structured or foam filled and may vary in geometry based on the requirements to resist crush and may elastically flex so they can be removed and refitted. A damper, such as an elastomeric mass 62 (FIG. 9), may be attached on the inside of wall 47 to provide damping or may be used to change blade or blade set vibration frequency.

The hook and loop layers 44 attachment system is particularly useful because it has high shear strength, is resilient to crushing loads, and is strong in perpendicular tension, however, it is advantageous in this application as it is weak in peel allowing easy removal. The central box 42 provides a lateral or circumferential force under engine running conditions that prevents the hook and loop layers 44 or other attachment means from peeling away from the surfaces 32p, 32s.

A resilient material, such as polyurethane, may be applied to the airwash surface 39 to provide a particularly smoother surface, which is also resistant to erosion and resilient to impact from small particles (such as sand).

Referring again to FIG. 3, a fillet 31 is integral to the boxes 41, 43 and includes a smooth aerodynamic surface transition between the blades surfaces 32p, 32s and the airwash surface 39 of the annulus filler 40. The fillet 31 section may be profiled so that the airflow provides a compressive force to ensure the fillet 31 does not peel away.

Figure 4:
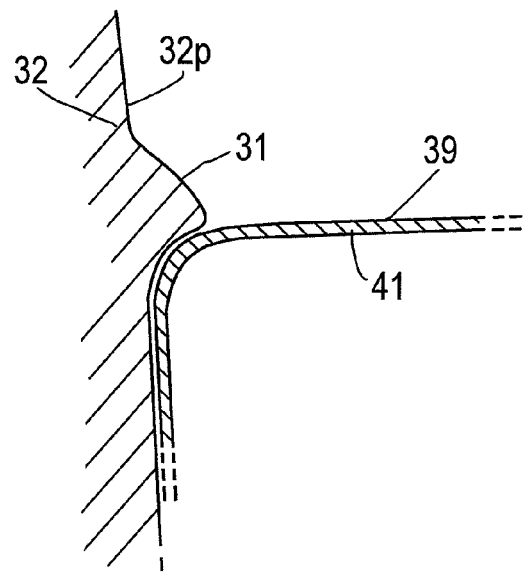
FIGS. 4 and 5 show detail of an interface between blade and the annulus filler of FIG. 3.
Figure 5:
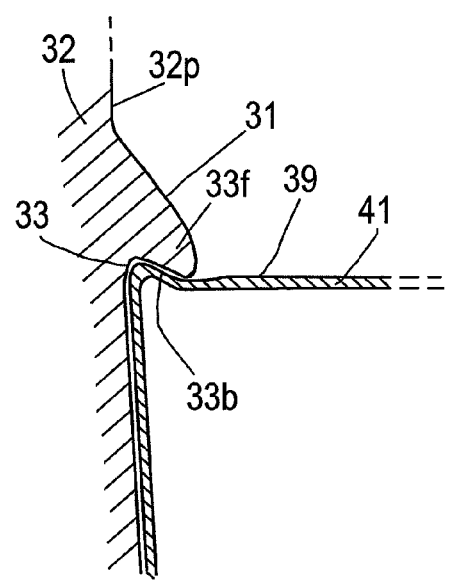

Referring to FIG. 4, alternatively the fillet 31 is integral to the blade 32 and provides a positive locator and stop for the box 41 as well as providing an aerodynamic shape for the airflow in that region. In FIG. 5, the fillet 31 defines a recess 33 and the shape of the box 41 compliments the recess 33 so that the sloping surfaces 33f and 33b of the fillet 31 and box 41 respectively provide a force to urge the box 41 against the blade 32. The recessed fillet 31 may also be applied at a radially inner part of the contact surface between blade 31 and box 41 to further secure the box 41 to the blade 31.

Assembly of the annulus filler 40 between the two adjacent blades 32 first includes the step of placing boxes 41 and 43 adjacent the blades 32, then squeezing together the central box 42 and radially lowering it between the boxes 41 and 43. The central box 42 is pushed radially downwardly against the disc 30 so that the fingers 49a, 49b are biased and when the box is released, the fingers 49a, 49b urge the walls 50, 51 against boxes 41, 43 and hold the annulus filler 40 between the blades 32.

Figure 6:
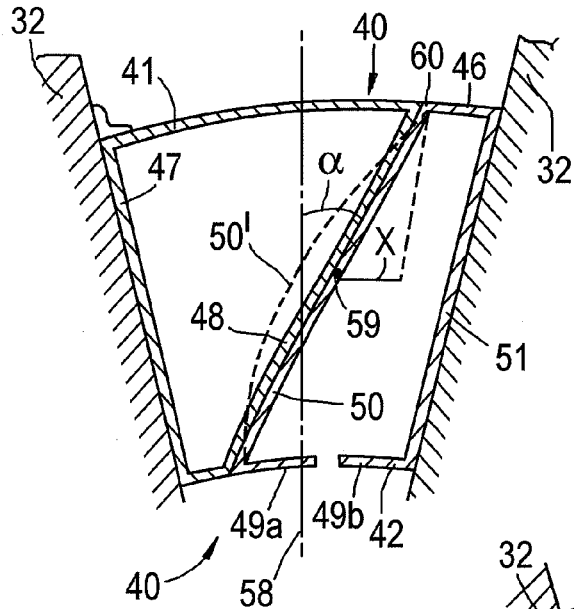
FIG. 6 is a section, AA in FIG. 2, through part of a fan assembly showing a second embodiment of an annulus filler in accordance with the present invention.

Referring now to FIG. 6, a second embodiment of the annulus filler includes only two boxes 41 and 42, however, this embodiment functions similarly to the three box embodiment described above. In this example, the box 42 is located next to the blade 32 and is attached thereto via a hook and loop layers 44 or other attachment means as described above. The wall 50 is in contact with wall 48 of the adjacent box 41. In situ the wall 50 is at an angle to a radial line 58 and has its centre of gravity 59 offset a distance X from a pivot point 60 at the radially outermost part of the wall 50. Thus during engine operation the wall 50 will be centrifuged outwardly and against wall 48 providing lateral or circumferential force to urge the boxes 41, 42 against the fan blades 32.

The wall 48 is preferably stiff to prevent it bending via forces from the wall 50. The wall 50 again includes a finger 49 which is biased against the disc 30 and provides a force between box 41 and box 42 and therefore between each box 41, 42 and adjacent blade 32 to keep the annulus filler 40 in the correct location. The wall 50 may also be biased, such that if the box 41 were not there the angle α would be greater than thereby the wall provides a further force between boxes 41 and 42. Similarly, the wall 50 may be arcuate as shown by dashed line 50' and only when inserted next to the box 41 does it assume the shape of the wall 48, thereby providing a biasing force therebetween.

It should be appreciated that some or all of the axial extent of the boxes may comprise such biasing means.

The radially inner wall 49 is divided into two fingers 49a, 49b which are sufficiently short so that when the box 42 is inserted they can pass through the aperture between box 41 and the right hand blade 32. Note that the wall 50 is flexible and may be compressed towards wall 51.

Assembly of the second embodiment of the annulus filler 40 between the two adjacent blades 32 first includes the step of placing box 41 against the blade 32, then squeezing together the box 42 and radially lowering it between the box 41 and blade 32. The box 42 is pushed radially downwardly against the disc 30 so that the fingers 49a, 49b are biased and when the box is released, the fingers 49a, 49b urge the walls 50, 51 against box 41 and hold the annulus filler 40 between the blades 32.

For all embodiments of the present invention, preferably the contact surfaces between the boxes 41, 42, 43 are high friction surfaces comprising hook and loop layers mentioned earlier, a surface roughness or a coating. The roughness or coating may be applied to part or the whole of the contact surfaces and is particularly beneficial at the radially outer areas of the contact surfaces.

Figure 7:
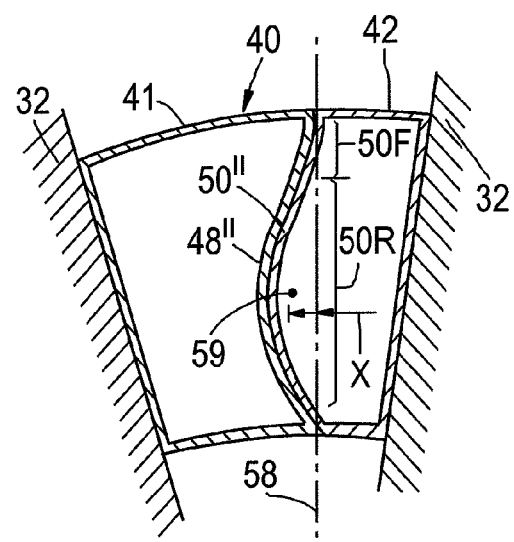
FIG. 7 is a section, AA in FIG. 2, through part of a fan assembly showing a third embodiment of an annulus filler in accordance with the present invention.

To further ensure the boxes 41, 42, 43 remain in place, particularly the box 42, the walls 50, 51 may be contoured or directionally biased as shown in FIG. 7 by a bulging wall shape 50" and complimentary shape of box wall 48". This bulge 50" is further advantaged in that when the engine is decelerating or running down and the centrifugal force is diminishing the wall shape 50" will help restore the boxes to their original aligned positions.

The OMC boxes 41, 42, 43 are shaped and structured to suit the forces met in use, thus the wall thicknesses may not be uniform around the box cross-section, and may not be the same along their axial length. Indeed, to save weight, some of the panel sections may have holes (such as triangles, pentagons or hexagons) in them, these are created by fibre displacement or in the case of a braided OMC box as part of the braid overlay, such as are naturally created by a tri-axial braiding method.

The central or locking box 42 can be of several shapes and may have features added to aid fitting and removal. These features may be present at one point, several points or all the way along the length. In one form, shown in FIG. 8, this may consist of tooling attachment points 64 on the fingers 49a & 49b to allow 'circlip' pliers to squeeze the box walls 50 and 51 together to allow it to be inserted during assembly or removed. Preferably this pinching is in the circumferential direction, but for other embodiments of the present invention the pinching may be in a radial direction.

Figure 9:
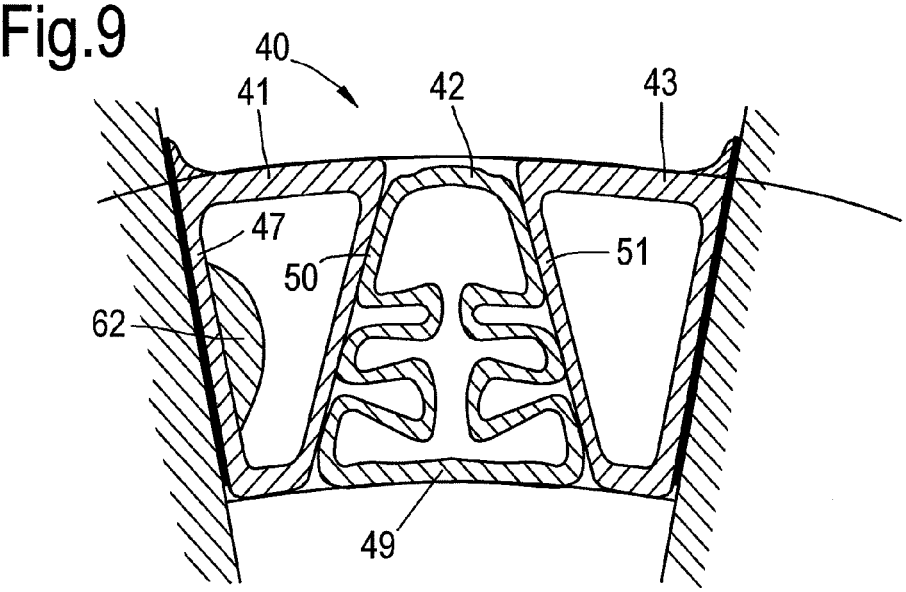

In FIGS. 9 and 10, a fourth embodiment of the present invention includes the central box 42 having one or two bellowed or concertina side walls 50, 51 or lower wall 49 to allow flexibility for both the installation and removal process. Advantageously, the bellowed or concertina walls are also able to accommodate events (such as bird strike), which result in significant movements of the blades 32; the bellowed or concertina walls help to provide a restorative force to the blades 32.

Assembly of the fourth embodiment includes the steps of inserting double pin pliers such that one jaw contacts points 62a & 62c and the other jaw contacts 62b & 62d (FIG. 10); closing the pliers jaws brings 62a closer to 62b and 62c closer to 62d; such that FIG. 9 arrangement now looks like FIG. 10.

The whole arrangement is eased downwards whilst moving side to side to release stiction between box sides 48 and central box sides 50 & 51. When this has released and moved down the assembly is withdrawn axially forward.

If the box 42 sticks to either or both boxes 41 and 43, the same double pinned tool can be turned 90 degrees and inserted with one jaw in the loop below 62a and loop above 62b, with the other jaw in the loop below 62c and above loop 62d. Closing the pliers, jaws squeezes box 42 and with a twisting clockwise and anticlockwise motion helps to release box 42. Then the procedure above is repeated to complete the removal.

This arrangement has the advantage of allowing some radial compression, for example, in the event of a bird strike. The struck blade 32 will rotate (vibrate) several degrees from radial. If the annulus filler 40 were rigid it may damage the blade 32 or be damaged itself possibly causing the filler 40 to be released. The bellows arrangement in FIG. 9 allows the blade 32 to rotate about its mounting to the disc by circumferentially and/or radially compressing the central box 42.

It will be apparent to a person skilled in the art of fibre reinforced articles that some parts of the box 42 are made more rigid than other parts—using selected ply lay-ups and direction of the fibre reinforcement and the difference between layers. For example, the annulus gap/line 39 between 41 and 43 is particularly stiff to prevent the centrifugal force or the force from blade movement squeezing box 42 out of annulus line 39 and escaping the assembly. This preferential stiffness is achieved using a mixed fibre composite, such as making some parts with large proportion of glass fibres, whilst other parts may have some boron fibres for tensile strength. The weave (or braid) angles affect the strength in particular directions; this is well known in the art.

A composite-to-composite non-sliding interface is preferable such as that provided by (44) and described under FIG. 3 description above, together with one that can seal the gas interface as well as accommodate blade vibration and movement and to be resilient in the event of a blade excursion.

FIG. 11 shows an additional arrangement to ensure retention of the central body or box 42. Bodies 41 and 42 comprise their radially outer walls 46 defining circumferentially extending arms 70 that overlap the central body 42. The circumferentially extending arms 70 create a flush airwash surface 39 and are recessed into correspondingly shaped grooves 72 defined in the radially outer wall of the central body. The arms 70 help to prevent the central body 42 from being released during engine running as well as providing an accurate location so that the airwash surface is as aerodynamic as possible. The arms 70 and grooves 72 extend the full axial length of the bodies 41, 43, but may partially extend the full axial length of the boxes or may be castellated. It should be appreciated that the circumferential extending arms 70 and grooves 72 may be applied to the other embodiments of the present invention described herein.

The present invention is advantaged in that the disc no longer includes conventional annulus filler retention features, which complicate its manufacture, increase weight and can compromise in service life. Because the disc is a critical part these advantages are amplified.

It should be apparent to the skilled person that various modifications may be made to the present invention without departing from its scope or spirit. For example, the angle of the walls 48, 50, 51 or the curvature of the wall 50' may be varied along the axial length to ensure the box-sections 41, 42, 43 are not fitted the wrong way around, conformal to the blade surfaces and re-locate themselves once the engine and centrifugal forces have reduced. This also allows features to be incorporated such that under extreme events any part of the annulus filler is less likely to be lost. The simplest form of this, since the annulus filler is usually fitted from the front towards the rear, is to taper the centre box from rear to front.

The key advantages of the present invention are: a lightweight annulus filler that has an easy method of attachment and removal; a high fatigue life component which is simple, cheap to manufacture; the sealing attachment is more robust, particularly at blade boundary and is resilience to impacts.

Further advantages of the present invention include the possibility of the box 41, 42, 43 adjacent the blades 32 incorporating means for adjusting 62 the moment weight of the blades 32. The boxes 41, 42, 43 may contain damping material, such as visco-elastic material to help minimize blade vibrations. This may be for noise, aerodynamic damping of the airwashed surface 39, and/or for blade circumferential and torsional movements.

What is claimed is:

1. A fan assembly of a gas turbine engine, the fan assembly comprising:
   a fan disc;
   an array of radially extending blades fitted into the fan disc and defining gaps therebetween; and
   an annulus filler located within at least one gap, wherein said annulus filler includes at least two individual bodies arranged circumferentially adjacent one another with at least one of said bodies contacting a blade, and wherein at least one of said bodies includes a flexible wall arranged to centrifuge outwardly against an adjacent one of said bodies during engine operation, thereby urging at least the adjacent body against a blade adjacent thereto, and securing the bodies and the blade.

2. A fan assembly as claimed in claim 1 wherein there are three individual bodies arranged circumferentially adjacent one another, only two bodies are located against adjacent blades.

3. A fan assembly as claimed in claim 2 wherein the middle one of the three individual bodies includes two flexible walls each arranged to centrifuge outwardly against an adjacent body.

4. A fan assembly as claimed in claim 1 wherein the flexible wall is angled from a radial line.

5. A fan assembly as claimed in claim 1 wherein the flexible wall is arcuate with its centre of gravity circumferentially offset from a radial line and arranged to centrifuge outwardly against the other body.

6. A fan assembly as claimed in claim 1 wherein the flexible wall is bellowed or a concertina.

7. A fan assembly as claimed in claim 1 wherein the flexible wall is arranged to provide a bias against the other body thereby urging both bodies against the blades and securing them particularly when the engine is not operational.

8. A fan assembly as claimed in claim 1 wherein one of the bodies comprises a radially inner wall arranged to provide a bias against the other body thereby urging both bodies against the blades and securing them particularly when the engine in not operational.

9. A fan assembly as claimed in claim 8 wherein the radially inner wall is formed of two fingers.

10. A fan assembly as claimed in claim 1 wherein a fillet is provided radially outwardly of the body and between the body and the blade.

11. A fan assembly as claimed in claim 10 wherein the fillet is integral to the blade or body.

12. A fan assembly as claimed in claim 10 wherein the fillet defines a recess and the shape of the body compliments the recess defining sloping surfaces and respectively, thereby providing a force to urge the body against the blade.

13. A fan assembly as claimed in claim 1 wherein at least one body comprises a circumferentially extending arm at a radially outer part and which overlaps another body.

14. A fan assembly as claimed in claim 13 wherein at least one body comprises a circumferentially extending groove into which the arm engages.

* * * * *